March 20, 1945. H. T. WOOLSON ET AL 2,371,864
WHEEL SUSPENSION FOR MOTOR VEHICLES
Filed Nov. 24, 1941 4 Sheets-Sheet 1
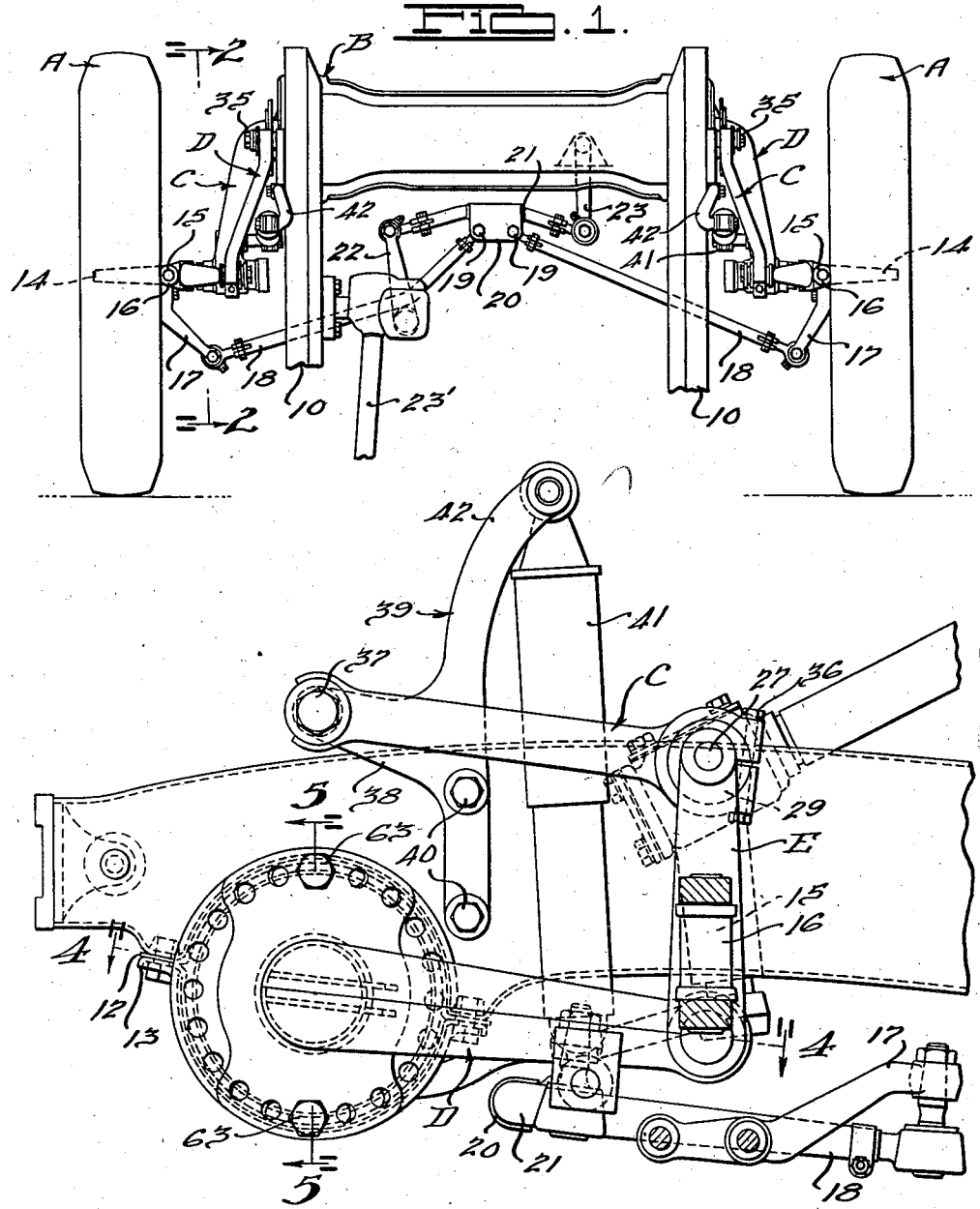
INVENTORS.
Harry T. Woolson,
Glenn H. Parker.
BY
Harness, Dickey, Pierce & Harris
ATTORNEYS.

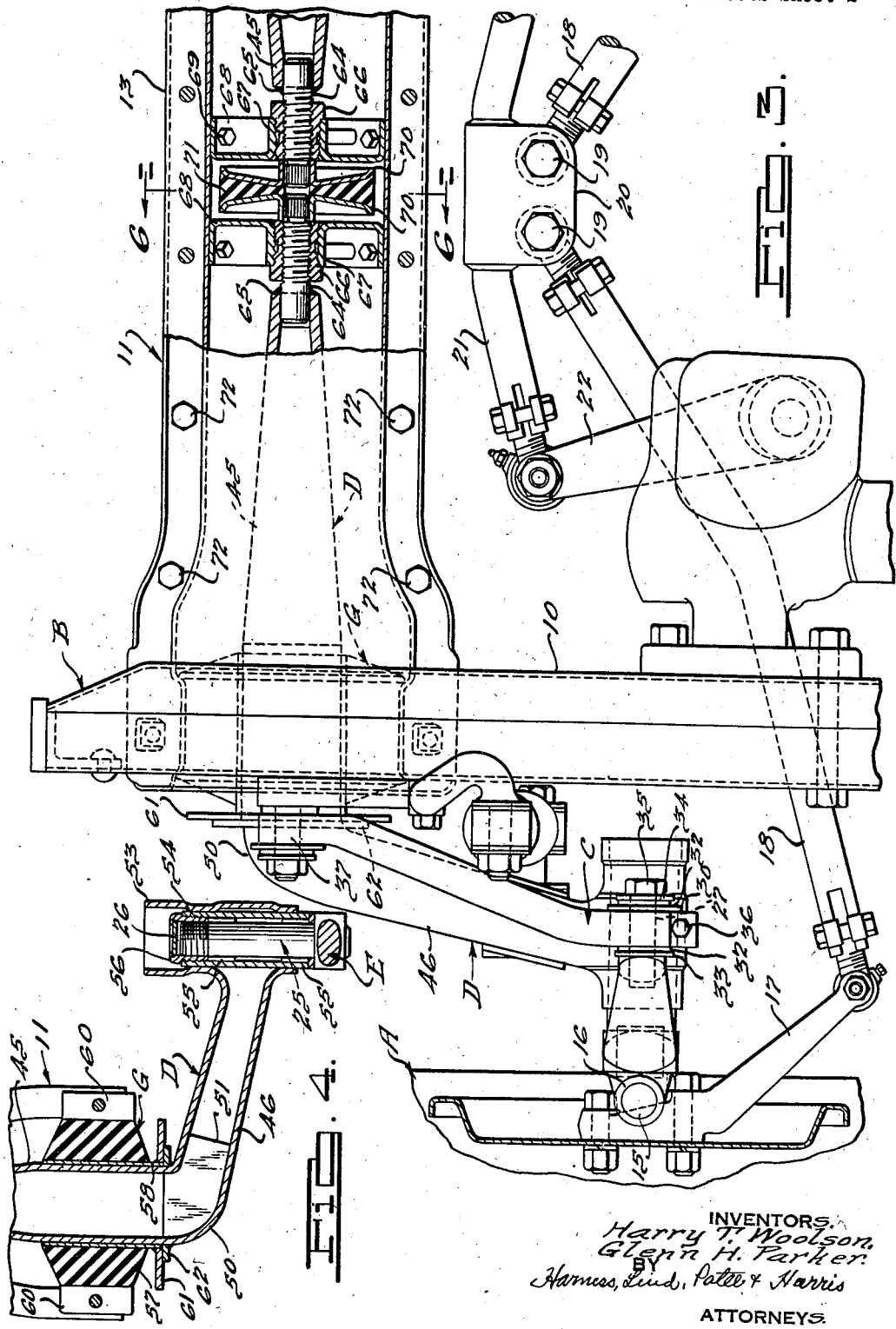

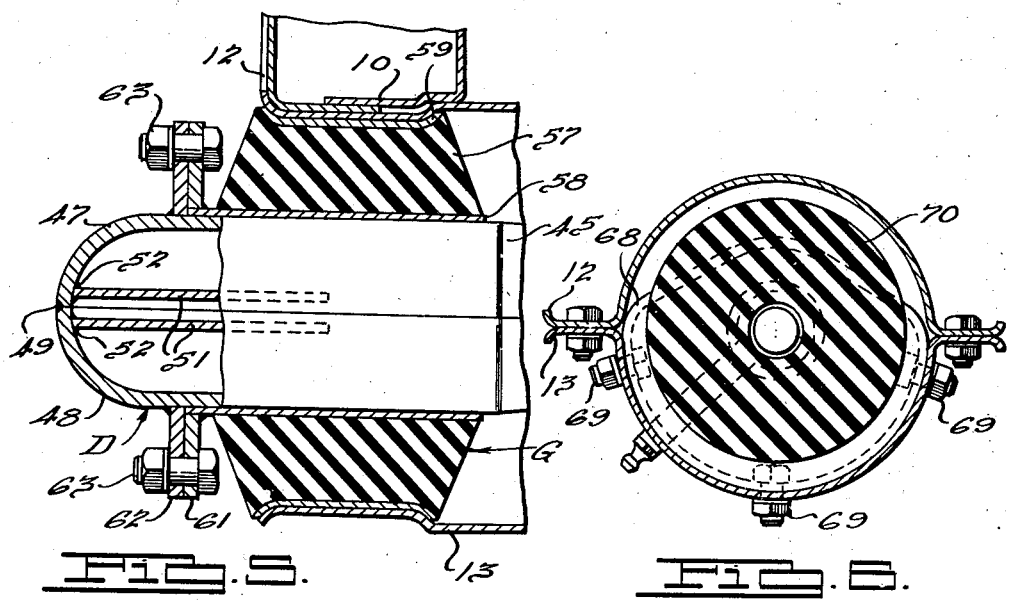

March 20, 1945. H. T. WOOLSON ET AL 2,371,864
WHEEL SUSPENSION FOR MOTOR VEHICLES
Filed Nov. 24, 1941 4 Sheets-Sheet 4
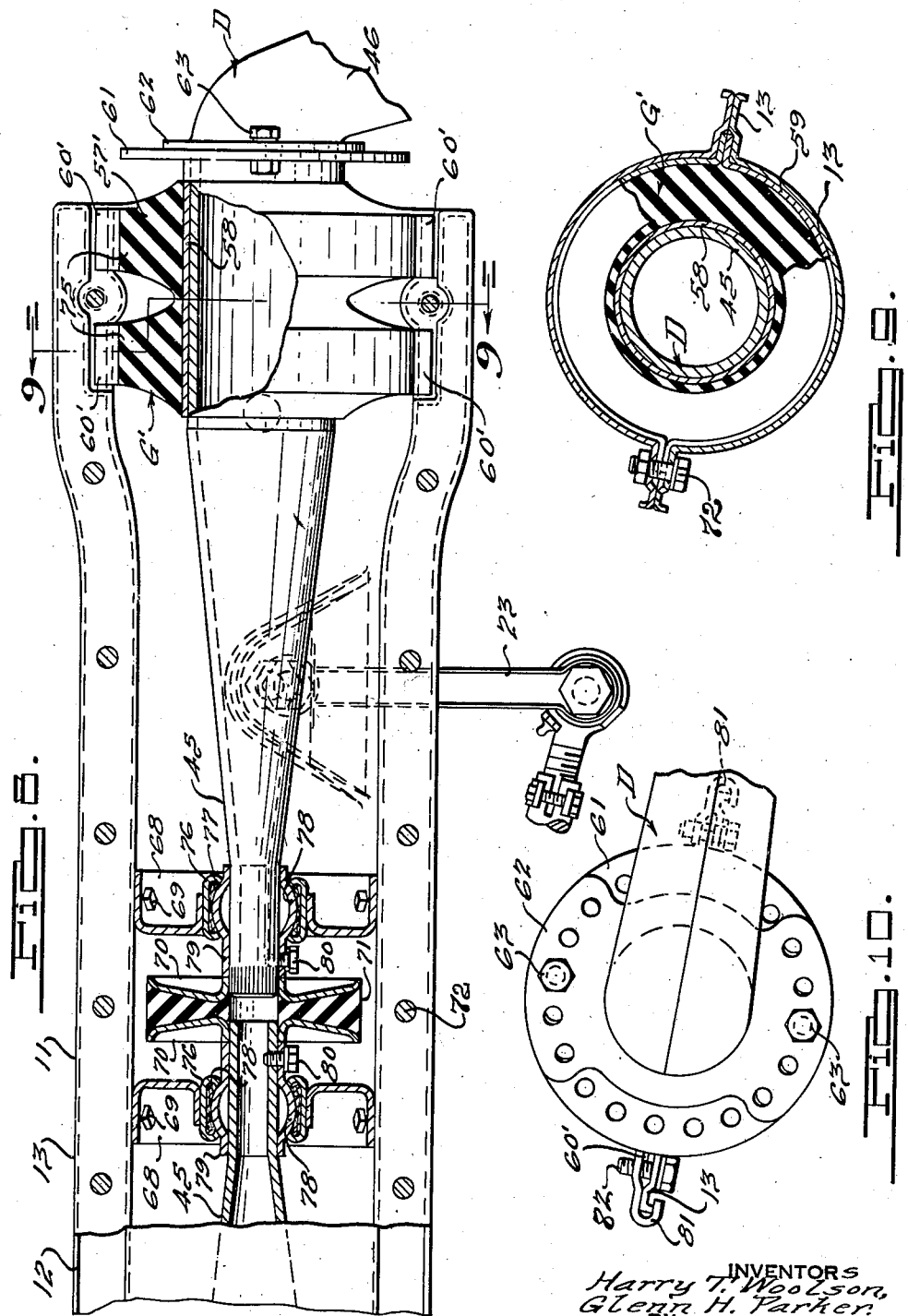
INVENTORS
Harry T. Woolson,
Glenn H. Parker.
BY
Harness, Dickey, Pierce & Harris
ATTORNEYS.

Patented Mar. 20, 1945

2,371,864

UNITED STATES PATENT OFFICE 2,371,864

WHEEL SUSPENSION FOR MOTOR VEHICLES

Harry T. Woolson, Detroit, and Glenn H. Parker, Royal Oak, Mich., assignors to Chrysler Corporation, Highland Park, Mich., a corporation of Delaware Application November 24, 1941, Serial No. 420,160

27 Claims. (Cl. 280—96.2)

This invention relates to motor vehicles and more particularly to improvements in wheel suspension therefor.

An object of the invention is to provide a wheel suspension of the independently sprung type characterized by improved riding qualities and economies in manufacture and assembly.

Another object of the invention is the provision of improved stabilizing means in a system of the foregoing type for exercising a controlling action on the rising and falling movement of each ground wheel and body roll.

A still further object of the invention is the provision of an independent wheel suspension comprising an improved parallelogram system mounted in an improved manner on the frame structure.

In carrying out the objects of the invention we preferably provide an oscillatory wheel carrying arm structure for each of the wheels, these structures each having a frame supporting portion extending generally transversely of the vehicle and connected to the frame through a body of deformable torsionally resisting material, such as rubber, for oscillation about a common axis during rising and falling movement of the wheels. Each arm structure further includes a wheel carrying portion extending generally longitudinally of the vehicle.

Each torsion mounting unit is preferably annular and formed with concentric inner and outer cylindrical surfaces connected respectively with the frame supporting arm portion and the vehicle frame to thereby stress the annulus torsionally. The torsion units yieldingly resist rising and falling movement of the associated wheels and accommodate limited displacement of the arm structures in a direction generally transverse to the axis about which the frame supporting portions oscillate to thereby eliminate harshness of the system to fore and aft wheel shocks and preventing transmission thereof to the vehicle frame, the arms fulcruming against the torsion units in response to fore and aft wheel displacement. The mounting units permit a certain amount of displacement of the arm frame supporting units inwardly with respect to the vehicle in response to laterally directed wheel shocks, which displacement interferes with normal wheel steering.

It is therefore a further object of the invention to provide a system wherein displacement of the frame supporting portions along said axis is effectively controlled and more particularly to provide control means of this character which journals the frame supporting arm portions for oscillation about the common axis and accommodates limited displacement of these portions generally transversely of this axis.

The frame supporting arm portions are preferably journalled as aforesaid adjacent their free end portions, which end portions are connected by stabilizing means comprising a body of rubber-like material having surfaces thereof respectively connected with these end portions for torsionally resisting relative movement therebetween.

The vehicle frame includes a hollow cross member comprising separable parts, one of which is normally secured at the ends thereof to the frame side rails, the other of these parts when attached being adapted to receive the frame supporting arm portions, the torsion mounting units, the journalling means and the stabilizing means, these enumerated structures constituting a bench sub-assembly which is secured to the frame by attachment of the separable cross member part to other parts which are normally secured to the frame rails as aforesaid. This arrangement thus facilitates assembly and subsequent servicing of the vehicle.

As a further feature of the foregoing assembly, each torsion spring unit has a tab fixedly secured to the outer cylindrical surface of the rubber annulus, which tabs are clamped between the cross member parts for connecting the outer surface of the annulus to the frame as aforesaid.

In order to add stability to the suspension, each oscillatory wheel carrying arm structure preferably has associated therewith a second frame pivoted arm and an upright member completing the parallelogram system. A shock absorber of the telescoping type is provided for controlling relative movement between the frame and wheel carrying arm structure, the frame being provided with an attaching member having arms for respectively connecting the shock absorber and the second suspension arm to the frame.

Other objects and advantages of our invention will be more apparent from the following description taken in connection with the accompanying drawings, in which:

Fig. 1 is a fragmentary top plan view of a motor vehicle chassis embodying the invention.

Fig. 2 is a side elevational view taken as indicated by the line 2—2 of Fig. 1.

Fig. 3 is an enlarged fragmentary top plan view illustrating a typical wheel suspension of Fig. 1 together with a portion of the steering mechanism, parts being broken away and in section.

Fig. 4 is a sectional plan view taken as indicated by the line 4—4 of Fig. 2.

Fig. 5 is an enlarged vertical sectional view taken on the line 5—5 of Fig. 2.

Fig. 6 is a transverse sectional view taken on the line 6—6 of Fig. 3.

Fig. 7 is a fragmentary side elevational view illustrating a sub-assembly of the wheel supporting arm structure prior to attachment thereof to the vehicle frame.

Fig. 8 is a view somewhat similar to Fig. 3, but illustrating a modified construction support for the oscillatory wheel carrying arms and stabilizer.

Fig. 9 is a transverse section taken as indicated by the line 9—9 of Fig. 8.

Fig. 10 is a side elevational view illustrating an assembly of the wheel carrying arm structure prior to attachment thereof to the vehicle frame.

Referring to the drawings, the invention is illustrated in connection with a motor vehicle including a pair of front steerable ground wheels A, each of which is supported for rising and falling movement independently of the remaining ground wheels of the vehicle. The vehicle frame structure B may be formed as a structural part of the body or may be in the nature of a chassis adapted to mount the body and comprises a pair of longitudinally extending side members 10 defining a closed box in cross section and a cross member, generally indicated by the numeral 11, including separable parts 12 and 13, the upper part 12 being fixedly attached at its opposite ends to the respective side rails 10 and the lower part 13 constituting a portion of the wheel carrying arm structure assembly as hereinafter more fully set forth.

Each of the wheels A is rotatable in the usual manner on a spindle 14 swivelly connected for steering movement by a king pin at 15 on a king pin receiving boss 16. Each spindle has a steering arm 17 pivotally connected with the adjacent end of a tie rod 18. Each rod 18 has an articulated connection at 19 with a saddle member 20 fixedly secured to a transverse link 21. One end of the link 21 is pivotally connected to the swinging pitman arm 22 forming a part of the steering assembly column 23' secured to a side rail 10 and the other end of the link 21 is pivotally connected to a lever 23 pivotally supported by the frame cross member 11.

The king pin boss 16 is carried at the outer end of an independent axle member 25 (Fig. 4) having its axis extending inwardly as an extension of the associated wheel spindle 14 and in a direction transverse to the frame B. Inasmuch as the mounting means for the wheels A are similar to each other, the description will, for the most part, be limited to the mounting for one of these wheels.

The axle member 25 has a threaded portion 26 and an upright arm E having pivotal connections with the respective upper and lower wheel carrying arm structures C and D extending generally longitudinally of the vehicle and being supported at their forward ends on the frame B for oscillatory movement. The upright E is rigid with the axle 25 and has an inwardly extending shank 27 rigid therewith. The axle member 25 and shank 27 are each individually formed and secured to the arm E by press-fitting the same into an opening in the latter and welding the same although if desired the axle 25 and shank 27 can be formed integrally with the arm E.

In providing the connection between the arms C and E, the rear end of the former has a yoked terminal 28 (Fig. 2) adapted to receive an eccentric bushing 29 having an inner bead 30 (Fig. 3) for facilitating rotative adjustment thereof in the yoke terminal 28. The bushing 29 receives a concentric spool-like bushing 31 of a rubber-like material, which in turn receives the shank 27. One of the annular radial ribs 32 of the bushing 31 is disposed between a shoulder 33 carried by the shank 27 and the adjacent face of the bushing 29 while the other rib 32 of bushing 31 is disposed between the other face of the bushing 29 and a washer 34, the parts being retained against displacement by a nut 35 screwed onto the end of the shank 27. A fastener 36 extends through the yoke portions of arm C for releasably holding the eccentric bushing 29 in any desired position of rotative adjustment with respect to the arm C. When the fastener 36 is released the eccentric bushing 29 can be rotated at the head portion 30 to thereby swing the upper end of the upright E in a direction fore and aft of the vehicle so as to rotate the axle member 25 on its axis and thus vary the setting of the caster angle of the wheel A at the king pin 15.

The forward end of the arm C has a pivotal connection at 37 (Fig. 2) with an arm 38 of a supporting member 39 secured by bolts 40 or the like to a frame side rail 10. A shock absorber 41 of the telescoping type has the upper part thereof secured to another arm 42 of the member 39 and the lower part thereof secured to the arm structure D.

The arm structure D is of hollow construction and comprises a tubular frame supported portion 45 which extends generally transversely of the frame structure B and which has a gradual taper in the direction of its free end. The structure D is also provided with a hollow wheel connecting portion 46, integral with the portion 45, and which extends generally longitudinally of the frame structure and laterally outwardly therefrom, thereby forming a crank-line portion offset rearwardly from the frame supported portion 45. The arm D is preferably formed by the two complementary parts 47 and 48 (Fig. 5) which are welded together at their abutting edges as indicated at 49. The arm structure D is bowed as at 50 (Figs. 3, 4) and the bowed portion is reinforced by flat plates 51 welded as at 52 to the respective arm forming parts 47 and 48.

The arm portion 46 terminates in a hollow and cylindrical axle carrying sleeve 53 extending generally transversely of the frame and fixedly carries a sleeve 54. The latter rotatably journals the associated axle member 25 by a pair of spaced bearings 55 of the anti-friction roller type. A second journal bearing is formed, by engagement of the threaded portion 26, with a bushing 56 in relatively shallow threaded engagement with the sleeve 54. Vertical and lateral loads acting between wheel A and frame B are taken by the arm structure D, the arm structure C functioning chiefly as a guide member for the axle 25 in maintaining the caster angle of the king pin 15 constant during rising and falling movement of the wheel A. Brake thrust of the associated ground wheel is also taken by the arm structure C.

Each arm structure D has its oscillation resisted by a torsionally acting supporting unit formed of a yieldable deformable material and so arranged as to "float" the arm structure to yieldably resist displacement thereof both axially of the frame supported portion 45 as well as transversely of this axis of oscillation. The supporting unit G comprises an annular body of resilient deformable material 57 preferably of rubber composition having its inner and outer cylindrical faces respectively secured as by vulcanization to inner and outer sleeves 58 and 59, the latter comprising semi-cylindrical portions having opposed radially extending tabs 60 (Fig. 4) received between the parts 12 and 13 of the cross member 11 when these parts are assembled, thus fixing the outer sleeve against rotation relative to the frame structure. The inner sleeve 58 has welded thereto a plate 61 forming a radial flange having a plurality of openings therein (Fig. 2) while the arm portions carries a somewhat similar flange forming plate 62 also provided with openings. The plates 61 and 62 are secured together by bolts 63 passing through registering openings, it being apparent that the inner sleeve 58 is thus rotatably secured to the portion 45 of the arm structure D.

In order to regulate the initial setting of the torsion unit G and thereby regulate the amount of relative movement of the frame structure and ground wheel under normal load conditions, the bolts 63 are removed and the plates relatively rotated by raising or lowering of the arm structure D, each of the bolts 63 being then inserted through registering openings in the plates for fixing the latter in the desired position.

It will be apparent that the rubber body 57 will torsionally resist oscillation of the arm D in supporting the load of the frame on the ground wheel and also resist rising and falling movement of the ground wheel with respect to the frame. Displacement of the arm portion 45 in the direction of its axis of oscillation will be yieldingly resisted by the rubber body 57 acting in tension, the latter acting in tension and compression in resisting displacement of the arm in a direction transversed to the above axis.

The free end of each arm portion 45 has inserted therein a portion of a pin 64, these parts being non-rotatably secured together by welding as at 65. Each pin 64 has a portion thereof in threaded engagement with a bushing 66 having relatively shallow threaded engagement with the sleeve forming portion 67 of a support 68 secured to the part 13 of the cross member 11 by bolts 69. Thus the inner end of each portion 45 of the arm structure D is supported by the frame cross member 11 and journalled for rotation about the axis extending transversely of the vehicle, there being sufficient clearance between the threads of the rod 64 and bushing 66 to accommodate limited displacement of the arm in a direction transverse to its axis.

Improved stabilizing or sway-eliminator means is provided for yieldingly resisting relative rotation of the two arm portions 45, which, among other things, keeps frame structure and vehicle body on an even keel especially when the vehicle is rounding a curve. This means has a controlling influence on the two steering ground wheels when the latter have relative vertical displacement although when the wheels rise and fall together this controlling influence is not present.

In providing the foregoing stabilizer and sway-eliminator means, each of the adjacent ends of the pin 64 extends beyond the associated support 68 and is serrated for non-rotative attachment to the sleeve portion of a plate-like member 70. The members 70 are arranged in spaced concentric relation and are operatively connected by a body of resilient deformable material 71, preferably rubber or a material having the characteristics of the latter. The body of material 71 is received between the plates 70 and has its axially opposite faces non-rotatably secured as by vulcanization to the adjacent face of a plate 70. In the arrangement each plate 70 rotates with its associated arm structure and relative rotation therebetween is resisted by the torsionally active body 71.

In assembly the cross member part 13, arm structures D, the units G, the journal supports at the adjacent ends of the structures D, and the stabilizer or sway-eliminator connection at the aforesaid ends constitute a sub-assembly unit, a fragmentary end view of which is shown in Fig. 7. Each frame side rail 10 is recessed to receive the associated unit G and the cross member part 12 is arched for this purpose at the cross member, the parts 12, 13 constituting a hollow cross member. This sub-assembly is detachably fixed to the frame cross member by a plurality of fasteners such as the bolts 72 received in registering apertures in the abutting flanged edges of the parts 12 and 13.

Referring to Figs. 8, 9 and 10, there is shown a modified form of the torsion supporting unit and of the journal support for the adjacent ends of the portions 45 of the arm structure D.

The torsion supporting unit G' includes the body of material 47' having parts 75 axially spaced throughout the major portion of the radial extent thereof but connected at the radial inner surface thereof by a relatively thin portion of the material 57'. This arrangement reduces the amount of material required and stresses are broken up. The material can be cured in relatively short time and uniformly throughout. The spacing also facilitates heat dissipation and prolongs the life of the material.

Referring to the journal support, the sleeve of the member 68 carries a support 76 having return bend ends between which is received a bushing 77 having a surface defining a portion of a sphere for journalling a correspondingly shaped portion 78 of a sleeve 79 non-rotatably secured to the arm portion 45 by a screw 80. This journal support, as does that in the foregoing embodiment, opposes axial movement of the arm portions 45 as permitted by the mounting units G. In the Figs. 8-10 embodiment the journal supports accommodate limited displacement of the arm portions 45 in a direction generally transverse to the axis of oscillation thereof in response to fore and aft displacement of the associated ground wheel A, it being understood that the body of material 57' will yieldably accommodate the latter displacement. Specifically, the cooperating journalling parts 77 and 78 permit oscillation of arm portion 45 journalled thereby about the journal as a center of oscillation. Relative displacement of the arms 45 in the aforesaid direction is resisted by the material 71 acting in shear, this material also functioning as set forth in connection with the previously described embodiment to resist relative oscillation of the arm structures.

This form of the invention permits of the sub-assembly unit as previously described, a fragmentary end view of the assembly being shown in elevation in Fig. 10. The arm structures D are detachably secured to the cross member part 13 by a clip 81 having spaced prongs embracing the flanged edge of the part 13 and the tabs 60', one prong of which has an opening registering with an opening in the part 13 which receives the fasteners 72, a bolt of like part 82 extending through these registering openings.

We claim:

1. In a motor vehicle having a frame structure and a pair of road wheels disposed at opposite sides thereof, a pair of coaxial rigid oscillatory elements extending transversely of the vehicle respectively connected to said wheels and having adjacently disposed end portions, a relatively rigid part at said end portion of each of said elements movable therewith and having a face disposed generally radially with respect to said axis, means connecting said elements with said frame structure for oscillation one independent of the other about a common axis, and a resilient non-metallic torsionally active body having relatively movable portions thereof respectively fixedly secured to said faces for oscillatory movement therewith and operable to yieldably oppose said independent oscillation.

2. In a motor vehicle having a frame structure and a pair of road wheels disposed at opposite sides thereof, a pair of rigid oscillatory elements respectively connected to said wheels and having adjacently disposed end portions, means connecting said elements with said frame structure for oscillation about a common axis, a pair of spaced plates respectively secured to said end portions for oscillation about said axis, and a resilient non-metallic torsionally active body having relatively movable portions thereof respectively fixedly secured to said plates.

3. In a motor vehicle having a frame structure and a pair of road wheels disposed at opposite sides thereof, a pair of rigid oscillatory elements respectively connected to said wheels and having spaced adjacently disposed end portions, means mounting said elements for oscillation about a common axis, a connector including a hollow axially extending part receiving one of said end portions and secured thereto for oscillation about said axis and further including a flange extending radially from said part, a second connector including a hollow axially extending part receiving the other of said end portions and secured thereto for oscillation about said axis and further including a flange extending radially from the last mentioned part, said flanges being axially spaced, and a resilient non-metallic torsionally active body disposed between and having relatively movable portions thereof respectively fixed for oscillatory movement with said plates.

4. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported rigid tubular section extending generally transversely of said frame structure, said sections having spaced adjacent end portions, means for mounting each of said tubular sections on said frame structure for oscillation about a common axis extending generally transversely of said frame structure, spaced means carried by said frame structure for respectively journalling said end portions for oscillation about said axis, axially spaced radially extending flanges respectively oscillatable with said end portions, and stabilizing means comprising a body of rubber-like material disposed between said flanges and having portions thereof respectively fixed for oscillatory movement with said flanges.

5. In a motor vehicle having a longitudinally extending frame structure and a pair of road wheels disposed at opposite sides of and adjacent one end of the frame structure, means associated with each of said wheels and said frame structure for supporting and guiding said wheels for independent rising and falling movement, each of said supporting and guiding means including an oscillatory wheel carrying arm structure having a frame supported rigid tubular section extending generally transversely of said frame structure, said sections having spaced adjacent end portions, means for mounting each of said tubular sections on said frame structure for oscillation about a common axis extending generally transversely of said frame structure, pins respectively extending into and secured to said tubular end portions for oscillation therewith, spaced means carried by said frame structure for respectively journalling said pins for oscillation about said axis, axially spaced radially extending flanges respectively oscillatable with said pins, and stabilizing means comprising a body of rubber-like material disposed between said flanges and having portions thereof respectively fixed for oscillatory movement with said flanges.

6. In a motor vehicle having a frame structure and a pair of road wheels disposed at opposite sides thereof, means associated with each of said wheels and said frame structure for supporting and guiding said wheels for independent rising and falling movement, each of said supporting and guiding means including a wheel carrying arm structure having a frame supported portion extending generally transversely of said frame structure, means comprising a body of deformable material for mounting each of said supported portions on said frame structure for yieldingly resisting oscillation of each supported portion about a common axis extending generally transversely of said frame structure, said frame supported portions having adjacently disposed end portions, spaced means journalling each of said end portions for oscillation about said common axis, each of said journal means including a stationary part carried by said frame structure and an associated sleeve-like part receiving the associated arm structure end portion and detachably secured thereto for oscillation therewith, a pair of connectors each having a sleeve-like part detachably secured to one of said end portions for oscillation therewith and an integral radially extending flange, and stabilizing means comprising a body of rubber-like material having portions thereof respectively fixed to said flanges for oscillatory movement therewith.

7. In a motor vehicle having a frame structure and a pair of road wheels disposed at opposite side thereof, means associated with each of said wheels and said frame structure for supporting and guiding said wheels for independent rising and falling movement, each of said supporting and guiding means including a wheel carrying arm structure having a frame supported portion extending generally transversely of said frame structure, means comprising a body of deformable non-metallic material mounting each of said supported portions on said frame structure and operable to yieldingly resist oscillation of each supported portion about a normal common axis extending generally transversely of said frame structure, each of said bodies permitting limited radial displacement of the associated frame supported portion relative to said axis and permitting limited displacement thereof along said axis, and spaced means respectively journalling said frame supported portions for rotation about said axis, each of said journal means accommodating said limited radial displacement of the associated portion preventing substantial displacement thereof along said axis.

8. In a motor vehicle including a frame structure having a cross member, a pair of road wheels disposed at opposite sides thereof, means associated with each of said wheels and said frame structure for supporting and guiding said wheels for independent rising and falling movement, each of said supporting and guiding means including a wheel carrying arm structure having a frame supported portion extending generally transversely of said frame structure and having adjacently disposed end portions, said frame supported portions being adapted for oscillation about a common axis, means comprising a body of deformable material for mounting each of said supported portions on said frame structure and yieldingly resisting oscillation of each supported portion about said common axis, each of said bodies permitting limited axial displacement of the associated frame supported portion inwardly along said axis, spaced means supported from said cross member respectively journalling said end portions accommodating said oscillation and preventing said axial displacement, and a body of torsionally active material intermediate said journal means having portions thereof respectively connected with said end portions for opposing relative oscillation thereof.

9. In a motor vehicle having a frame structure and a pair of road wheels disposed at opposite sides thereof, means associated with each of said wheels and said frame structure for supporting and guiding said wheels for independent rising and falling movement each of said supporting and guiding means including a wheel carrying arm structure having a frame supported portion extending generally transversely of said frame structure, means comprising a body of deformable material for mounting each of said supported portions on said frame structure for yieldingly resisting oscillation of each supported portion about a normal common axis extending generally transversely of said frame structure, each of said bodies accommodating limited displacement of the associated frame supported portion in a direction generally transverse to said axis and permitting limited displacement thereof inwardly along said axis, and spaced means respectively journalling said frame supported portions, said journal means accommodating the first mentioned limited displacement and resisting said axial displacement, each of said means including a stationary part carried by said frame structure having an arcuately shaped seat and a second part movable with said frame supported portion having an arcuately shaped portion engaging said seat.

10. In a motor vehicle having a frame structure and a pair of road wheels disposed at opposite sides thereof, means associated with each of said wheels and said frame structure for supporting and guiding said wheels for independent rising and falling movement, each of said supporting and guiding means including a wheel carrying arm structure having a frame supported portion extending generally transversely of said frame structure, means comprising a body of deformable material for mounting each of said supported portions on said frame structure for yieldingly resisting oscillation of each supported portion about a common axis extending generally transversely of said frame structure, said frame supported portions having adjacently disposed end portions, each of said bodies accommodating limited displacement of the associated frame supported portion in a direction generally transverse to said axis and permitting limited axial displacement thereof inwardly along said axis, means journalling each of said frame supported portions adjacent the end portion thereof for rotation about said axis, each of said journal means accommodating the first mentioned limited displacement and resisting said axial displacement of the associated frame supported portion, and stabilizing means comprising a body of rubber-like material having portions thereof respectively fixed to said end portions for oscillatory movement therewith.

11. In a motor vehicle having a longitudinally extending frame structure and a road wheel disposed adjacent one end of said structure, means associated with said wheel and frame structure for supporting and guiding said wheel for rising and falling movement independently of the remaining wheels of the vehicle, said supporting and guiding means comprising a tubular oscillatory wheel carrying arm including complementary parts secured one to the other, said parts being so shaped in cross section and so bowed intermediate the lengths thereof as to form a hollow cylindrical frame supported portion extending generally transversely of said frame structure and a hollow portion offset from said frame supported portion in a direction generally longitudinally of said frame structure, a relatively flat reinforcing gusset in the bowed region of each of said parts, a sleeve carried by an end of said offset portion and extending generally transversely thereto, an axle member swively mounting said wheel journalled in said sleeve, and a plurality of means for respectively swingingly mounting said axle member and said frame supported arm portion on said frame structure.

12. In a motor vehicle having a frame including laterally spaced longitudinally extending side rails and a hollow cross member extending transversely of the vehicle and including detachable parts one thereof having its opposite ends respectively structurally connected to said side rails, a pair of road wheels disposed at opposite sides of and adjacent one end of the frame, means associated with each of said wheels and said frame for supporting and guiding said wheels for independent rising and falling movement, each of said supporting and guiding means including an oscillatory arm having a frame supporting portion extending transversely of the vehicle, a torsion spring for mounting each of said supporting portions on said frame including a torsionally active body of deformable material having relatively movable surfaces one fixedly connected with the associated arm and the other adapted to be fixed with respect to said frame for yieldingly resisting oscillation of each supporting portion about a common axis extending generally transversely to the vehicle, the other of said cross member parts when detached from said one part being adapted to receive said frame supporting portions of the arms and said springs, spaced means carried by said other cross member part for respectively journalling said frame supporting portions for oscillation about said axis, said other frame supporting part, said arms, said springs and said journalling means constituting a sub-assembly unit, and means detachably securing said cross member parts together whereby said sub-assembly unit is connected to said frame and the other of said relatively movable surfaces is fixed with respect to said frame.

13. In a motor vehicle having a frame including laterally spaced longitudinally extending side rails and a hollow cross member extending transversely of said frame, a pair of road wheels disposed at opposite sides of and adjacent one end of said frame, means associated with each of said wheels and said frame for supporting and guiding said wheels for independent rising and falling movement, each of said supporting and guiding means including an oscillatory wheel carrying arm having a frame supporting portion extending into said cross member and generally transversely of the frame, means comprising a body of deformable material for mounting each of said supporting portions on said frame for yieldingly resisting oscillation of said supporting portions about a common axis, each of said bodies comprising a torsionally resistant annulus disposed in said cross member and having its inner and outer portions connected respectively to the associated frame supporting portion and said cross member, said cross member including substantially coextensive sections engaged one with the other for connecting the outer portions of said annuli as aforesaid and said sections being relatively separable to disengage said annuli from the frame.

14. In a motor vehicle having a frame including laterally spaced longitudinally extending side rails and a hollow cross member extending transversely of said frame including relatively separable parts, a pair of road wheels disposed at opposite sides of and adjacent one end of said frame, means associated with each of said wheels and said frame for supporting and guiding said wheels for independent rising and falling movement, each of said supporting and guiding means including an oscillatory wheel carrying arm having a frame supporting portion extending into said cross member and transversely of the frame, means comprising a body of deformable material for mounting each of said supporting portions on said frame for yieldingly resisting relative oscillation of said supporting portions about a common axis, each of said bodies comprising a torsionally resistant annulus in said cross member having its inner and outer portions connected respectively to the associated frame supporting portion and said cross member, the connection between said outer portion and cross member including a tab secured to said outer portion and clamped between said cross member parts.

15. In a motor vehicle having a frame structure and a ground wheel disposed adjacent thereto, means for supporting and guiding rising and falling movement of said wheel independently of the remaining wheels of the vehicle including a wheel supporting link member having an articulated connection with said frame structure and a wheel guiding link member spaced vertically from said supporting link member, an upright arm operatively connecting adjacent end portions of said link members, a shock absorber operatively secured to said supporting link member, and a supporting member fixedly carried by said frame structure including a first arm operably connecting said shock absorber with the frame structure and a second arm having an articulated connection with said guiding link member.

16. In a motor vehicle having a frame structure and a steerable ground wheel disposed adjacent thereto, an axle structure swivelly mounting said wheel and extending inwardly therefrom in a direction transverse to the vehicle, a parallelogram system between said structures for supporting and guiding rising and falling movement of said wheel independently of the remaining wheels of the vehicle including a pair of frame supported oscillatable arm structures extending generally longitudinally of the vehicle for respectively supporting and guiding said wheel movement, means mounting said supporting arm structure on said frame for oscillation about an axis extending generally transversely of the vehicle, means journalling said axle structure on one end portion of said supporting arm structure, an upright member rigidly secured at one end thereof to said axle structure and having its opposite end articulated with an end portion of said guiding arm structure, a shock absorber secured to said supporting arm structure, and a relatively rigid member fixedly carried by said frame structure including a first arm having an articulated connection with the other end portion of said guiding arm structure and a second arm connected to said shock absorber.

17. A resilient wheel suspension for vehicles, comprising a pair of substantially coaxial shafts rotatably supported in a chassis or vehicle body, means connecting said shafts to one another, comprising a rubber element having two metal plates vulcanized respectively to two opposite faces thereof, means securing the shafts to the respective metal plates, whereby relative rotation of said shafts about their common axis will stress the said rubber element in torsional shear, and an additional torsionally-resilient member of non-metallic material such as rubber between each shaft and said chassis or body, said last-named member being adapted for resiliently supporting said chassis or body on the road wheels.

18. In a motor vehicle having a pair of road wheels disposed at respective opposite sides thereof, relatively rigid oscillatory elements respectively connected with said wheels for rotation of the latter relative thereto and mounted for oscillation about a normal common axis in response to rising and falling wheel movement, journal means for each of said elements accommodating oscillation thereof about said axis and displacement thereof about an axis other than said common axis while preventing substantial displacement of the element journalled thereby in the direction of said common axis, and means providing a connection between said elements operable to yieldably oppose relative oscillation thereof.

19. In a motor vehicle having a pair of road wheels disposed at respective opposite sides thereof, relatively rigid oscillatory elements respectively connected with said wheels for rotation of the latter relative thereto and mounted for oscillation about a normal common axis in response to rising and falling wheel movement, journal means for each of said elements accommodating oscillation thereof about said axis and displacement thereof about said journal as a center of oscillation while preventing substantial movement of the element journalled thereby in the direction of said common axis, and means providing a connection between said elements operable to yieldably oppose relative oscillation thereof.

20. In a motor vehicle having a pair of road wheels disposed at respective opposite sides thereof, relatively rigid oscillatory elements respectively connected with said wheels for rotation of the latter relative thereto and mounted for oscillation about a normal common axis incident to wheel displacement vertically, journal means for each of said elements accommodating oscillation thereof about said axis and displacement thereof about said journal as a center of oscillation while preventing substantial movement of the element journalled thereby in the direction of said common axis, each of said journals including a substantially arcuate contoured seat and a correspondingly contoured part engaged with the seat, and a body of rubber-like material so connected with said elements as to oppose relative oscillation thereof by torsional stress of said material.

21. A resilient wheel suspension for vehicles, comprising a pair of substantially coaxial shafts rotatably supported in a chassis or vehicle body for rotation about a normal common axis, means connecting said shafts to one another, comprising a rubber element having two metal plates vulcanized respectively to two opposite faces thereof, means securing the shafts to the respective metal plates, whereby relative rotation of said shafts about their common axis will stress the said rubber element in torsional shear, means journalling each of said shafts for rotation about said axis, each of said journalling means preventing substantial movement of its shaft in the direction of said axis and accommodating displacement thereof relative to said axis, and an additional torsionally-resilient member of non-metallic material connecting each of said shafts with said chassis or vehicle body for rotation relative thereto about said common axis.

22. A resilient wheel suspension for vehicles, comprising a pair of substantially coaxial shafts rotatably supported in a chassis or vehicle body for rotation about a normal common axis, means connecting said shafts to one another, comprising a rubber element having two metal plates vulcanized respectively to two opposite faces thereof, means securing the shafts to the respective metal plates, whereby relative rotation of said shafts about their common axis will stress the said rubber element in torsional shear, means journalling each of said shafts for rotation about said axis, each of said journalling means preventing substantial movement of its shaft in the direction of said axis and accommodating displacement thereof about an axis contained by the journalling means therefor, and an additional torsionally-resilient member of non-metallic material connecting each of said shafts with said chassis or vehicle body for rotation relative thereto about said common axis.

23. In a motor vehicle including a frame structure and a road wheel, a suspension for said wheel including a frame supporting part extending generally transversely of the vehicle and a crank-like wheel carrying part relatively rigid with said frame supporting part, means journalling said frame supporting part for oscillation about a normal axis and accommodating displacement thereof about the journal means as a center of oscillation while preventing substantial movement of said frame supporting part in the direction of said normal axis, and a body of deformable non-metallic material securing said frame supporting part to said frame structure yieldably resisting oscillation of the last mentioned part about said normal axis while accommodating said displacement.

24. In a motor vehicle including a frame structure and a road wheel, an oscillatory wheel carrying structure, means mounting said arm structure in load supporting relation to said frame structure including a body of rubber-like material having relatively movable portions resisting oscillation of said arm structure, means securing one of said portions to said frame structure, means securing the other of said portions to said arm structure including relatively rigid parts respectively fixed to said other surface and said arm structure, and a detachable connection between said parts retaining the same in a fixed relative position for oscillation thereof with said arm structure, said connection being releasable to accommodate adjustment of the part carried by the arm structure to a second position relative to said first part to thereby adjust the relative position of said structures.

25. In a motor vehicle including a frame-like structure and a road wheel, an oscillatory wheel carrying arm structure, means securing said arm structure relative to said frame structure including a body of rubber-like material resisting oscillation of the arm structure having relatively movable portions, one secured to said frame structure, means adjustably securing the other of said portions to the arm structure for movement therewith, said means including adjacent plate-like parts respectively fixed for movement with said other portion and said arm structure, one of said parts having a series of spaced openings therein and the other of said parts having an opening selectively registerable with an opening of said series, and fastening means detachably engaged with said one opening and the selected opening of said series operatively securing said parts together.

26. In a motor vehicle having a pair of oppositely disposed road wheels, an arm structure connected with each of said wheels, a body of rubber-like material mounting each of said arm structures and yieldable to accommodate oscillatory movement thereof, means journalling each of said arm structures for said oscillatory movement, each of said journal means operating to retain its arm structure against substantial displacement in the direction of the axis of oscillation thereof while accommodating displacement of such arm structure about an axis other than said axis of oscillation, and a body of rubber-like material having portions thereof respectively connected with said arm structures whereby relative oscillation thereof will torsionally stress the last mentioned material.

27. In a motor vehicle having a pair of oppositely disposed road wheels, means including arm structures respectively associated with said wheels for supporting and guiding the same for independent rising and falling movement, means mounting each of said arm structures relative to the vehicle for independent limited oscillatory movement in response to rising and falling movement of the wheels, each of said mounting means permitting limited displacement of its arm structure in the direction of the axis of oscillation thereof and in a second direction generally transverse to said axis, means journalling each of said arm structures for said oscillatory movement, each of said journal means operating to retain the arm structure journalled thereby against substantial displacement in the direction of said axis while accommodating displacement thereof in said second direction, and means providing a connection between said arm structures operable to oppose relative oscillatory movement thereof.

HARRY T. WOOLSON.
GLENN H. PARKER.